(12) United States Patent
Kreick

(10) Patent No.: US 6,420,718 B1
(45) Date of Patent: *Jul. 16, 2002

(54) MODULATED INFRARED SOURCE

(75) Inventor: John R. Kreick, Nashua, NH (US)

(73) Assignee: BAE Systems Information and Electronics Systems Integration, Inc., Nashua, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 05/543,295

(22) Filed: Jan. 20, 1975

(51) Int. Cl.$^7$ .............. G01J 1/00; H04K 3/00; G02B 26/02; B64D 47/06
(52) U.S. Cl. ............... 250/504 R; 244/3.16; 359/233; 359/235; 359/236; 359/298; 359/111; 340/981
(58) Field of Search ................ 250/495, 504, 250/504 R; 340/50, 25, 366, 366 F, 911; 240/24, 49, 41.35 A, 41.35 C, 41.37, 46.47, 50; 350/259; 244/3.16; 359/111, 235, 236, 298

(56) References Cited

U.S. PATENT DOCUMENTS

| | | | | | |
|---|---|---|---|---|---|
| 1,101,683 A | * | 6/1914 | Cote | ................... | 240/49 |
| 1,238,220 A | * | 8/1917 | Thurber | ................... | 240/49 |
| 1,417,457 A | * | 5/1922 | Cook | ................... | 240/49 |
| 1,486,731 A | * | 3/1924 | Cook | ................... | 240/49 |
| 1,754,950 A | * | 4/1930 | Henocque et al. | ........... | 250/494 |
| 3,706,968 A | * | 12/1972 | Turner, Jr. | ............... | 340/366 F |
| 3,886,350 A | * | 5/1975 | Katsukura et al. | ............. | 240/24 |

FOREIGN PATENT DOCUMENTS

IT      209757    *   8/1940            240/49

* cited by examiner

*Primary Examiner*—Stephen C. Buczinski
(74) *Attorney, Agent, or Firm*—Daniel J. Long

(57) ABSTRACT

A modulated infrared source is disclosed in which spatial modulation is accomplished by the rotation of beam forming optics about an infrared source in which a portion of the energy in the beam produced includes energy coming directly from the IR source without being reflected. Close to 100% of the energy from the infrared source is focused by rotating parabolically shaped elements, such that energy losses due to the modulation technique are minimized. The speed of the rotation of the reflective optics is minimized while maintaining sufficiently high modulation frequencies by the provision of four beams from a single source.

16 Claims, 3 Drawing Sheets

SPATIAL MODULATION
100% ENERGY UTILIZATION

PRIOR ART
TEMPORAL
MODULATION

SPATIAL MODULATION
100% ENERGY UTILIZATION

A — NOTE RETURN TO ZERO LEVEL: SIGNAL MODULATED

B — NOTE NO RETURN TO ZERO LEVEL. SIGNAL NOT SUFFICIENTLY MODULATED

MODULATED INFRARED SOURCE

This invention relates to modulated infrared sources and more particularly and generically to modulators in which spatial modulation is provided.

The modulation of infrared radiation, due to its long wavelength, has not been accomplished easily in the past. Problems in modulation of infrared energy include those of unwanted refraction due to the long wavelengths as well as absorption of the energy by the apparatus utilized in the modulation technique. Absorbed energy is reradiated in a diffused pattern thereby in many instances degrading the modulation. Additional problems center around materials which can withstand the infrared radiation while the same time being sufficiently light weight and structurally stable enough to withstand cyclic motion normally employed in the production of a modulated beam. It will be appreciated that when IR sources include heated elements, modulation of the energy to the element is ineffective to cause modulation of the radiation from the element due to the long heating and cooling cycles inherent with the IR sources in which elements are heated.

One of the most important applications of modulated infrared sources is in the area of infrared countermeasures. In this application, the modulated infrared source is employed to render ineffective heat seeking missiles which home in on the heat generated by the engines which propel the target at which the missile is aimed. These engines include internal combustion engines, jet engines, rocket engines or the like.

In general, it is the purpose of the infrared countermeasure device to produce a modulated infrared signal of sufficiently high intensity to blanket or mask the infrared output from the above mentioned engines. Modulated infrared sources exist in the prior art which employ IR sources with temporal modulators for this purpose. In one embodiment temporal modulation involve the so-called "chopper" technique, in which apertures spaced from the source are sequentially covered and uncovered in a shutter technique. However, in these sources when the apertures are covered energy radiated from the IR source is either absorbed by the occluding member or reflected back into the source at a non-optimum angle such that this energy is lost. Where energy for the IR source is virtually unlimited such as is the case when fuel is burned for the production of infrared radiation, temporal modulation techniques work well. Temporal modulation of electrically powered sources also works well where sufficiently large amounts of electrical power are available as in jet powered fighter aircraft. However, when the IR source must depend for its energy on electrical power which is critically limited, it is desireable that as much of the energy from the IR source as possible be utilized in order that the infrared source radiate sufficient energy to blanket or mask the infrared energy from the taget's engine.

Moreover, to provide omnidirectional or near omnidirectional coverage the infrared source must be omnidirectional so as to be able to counter measure heat seeking missiles coming in from any direction. In the prior art omnidirectional coverage has been obtained by the provision of a large number of apertures about the IR source. The modulation is obtained by the rotation of a cylindrically shaped mask in front of the apertures. While these systems are effective where unlimited power is available, the provision of temporal modulation presents a problem of efficiency which can be critical in many applications because the radiation from the source may be blanketed or masked by radiation from the target.

Moreover, due to the limited power available the coupling of 100% of the power from the IR source out of the source is so critical that the shape of the projected infrared image becomes exceedingly important. Assuming a line source, which is effectively an omnidirectional radiator, it has been found that refractive optics which would ordinarily focus and couple out a great deal of the energy from the IR source suffer from the fact that the radiated image is not linear. If the image is considered to be rectangular, with the use of refractive optics, the long sides of the rectangle are bent inwardly in a concave manner. Thus, maximum intensity appears at the center of the rectangular image, with the energy being somewhat reduced towards the ends of the image. When energy levels are critical the refractive optics may result in a situation where the energy from the infrared source is enough less than that of the energy from the target's engines such that the infrared source is blanketed or masked by the infrared energy from the target rather than the other way around. The ratio of infrared energy from the source vis-a-vis infrared energy from the target is called the jam-to-signal ratio and this ratio is a measure of the effectiveness of the infrared source as a counter-measure. It will be appreciated that if this ratio is greater than 1, the infrared source can be effective as a countermeasure.

The above problems are solved by the subject invention in which close to 100% of the infrared energy is coupled out into space by "spatial modulation". The term "spatial modulation" as used herein refers to the sweeping of an infrared beam past a point in space removed from the infrared source a number of times per second, corresponding to the frequency of the modulation. In one embodiment of the subject invention this is accomplished by rotating the focusing optics about a stationary infrared source at an rpm commensurate with the modulation frequency desired. The optics in the preferred embodiment are reflective optics in which a narrow parabolically shaped reflector surrounds an infrared source such that a beam is formed in which a portion of the energy in the beam comes directly from the IR source, with the other portion being reflected. Direct radiation in the beam is important because it contributes substantially to the coupling of close to 100% of the radiation from the source to a distant point. The use of a narrow parabola also permit the generation of a highly defined beam with unusually sharp edges. The source is located at the focus of the reflector and the reflector is rotated about its focus. Multiple reflectors may be provided to provide multiple beams.

It is therefore an object of this invention to provide an improved modulated infrared source in which reflective optics are rotated about an IR source to produce a beam which sweeps by a point in space with the beam formed having a portion of its energy coming directly from the IR source.

It is a further object of this invention to provide modulation of an infrared source by the revolving of parabolically contoured focusing optics about the infrared source.

It is another object of this invention to provide a spatially modulated infrared source in which a number of infrared sources are each located in a different reflective cavity of a housing which is rotated with the reflective cavities forming the focusing optics.

It is a further object of this invention to provide reflective focusing for an infrared source in which the beam formed by the focusing means is extremely sharp and well defined in the infrared region of the electro-magnetic spectrum and in which some energy in the beam comes directly from the infrared source.

It is a yet still further object of this invention to provide a modulated omnidirectional infrared radiation source isotropic in azimuth.

These and other objects of this invention will be better understood in connection with the following description in view of the appended drawings in which.

Figure 7:
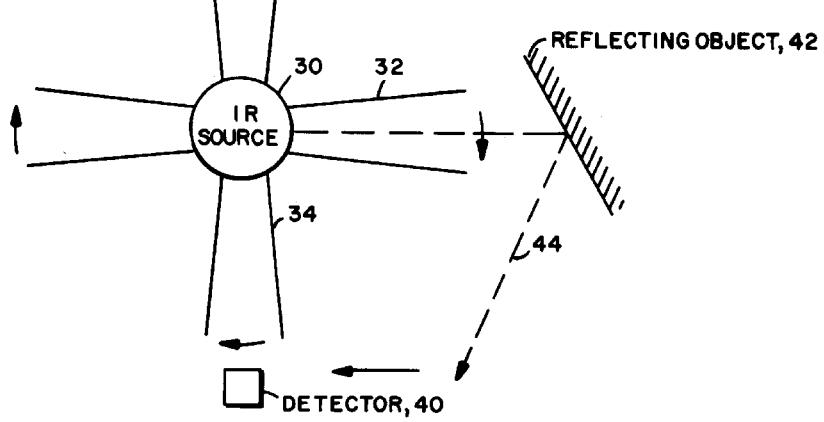
FIG. 7 is a diagramatic illustration of a spatially modulated infrared source in which a portion of the radiation impinges on a reflecting object and is reflected in the vicinity of a detector spaced from the IR source.
Figure 8:
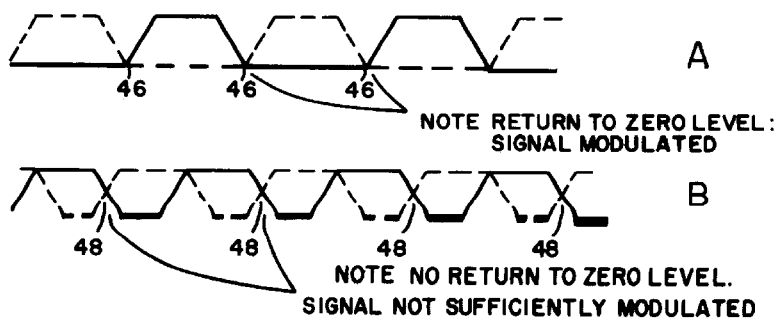
Figure 9:
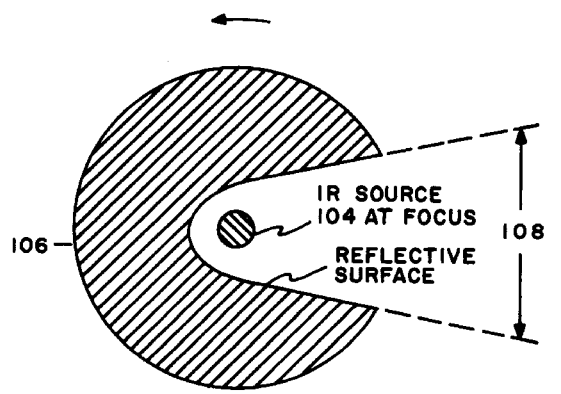
Figure 10:
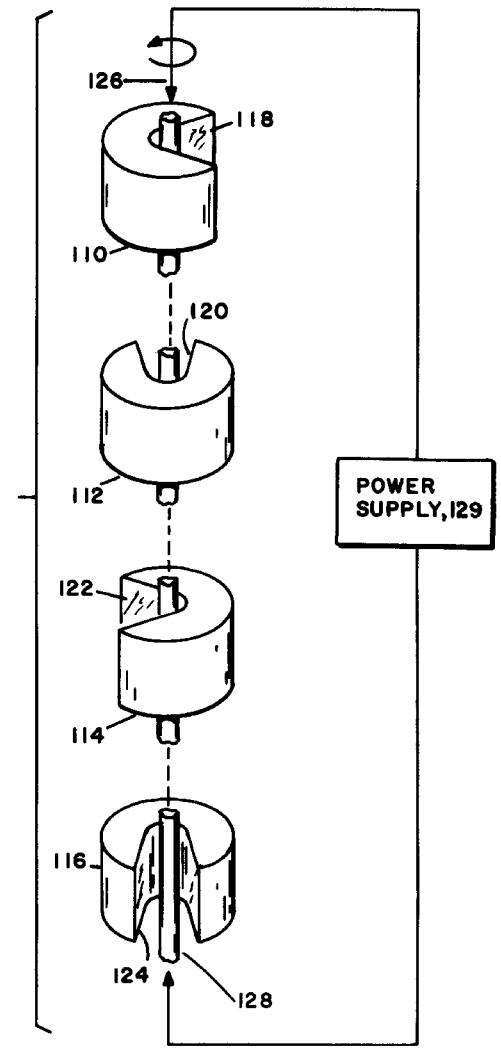
Figure 11:
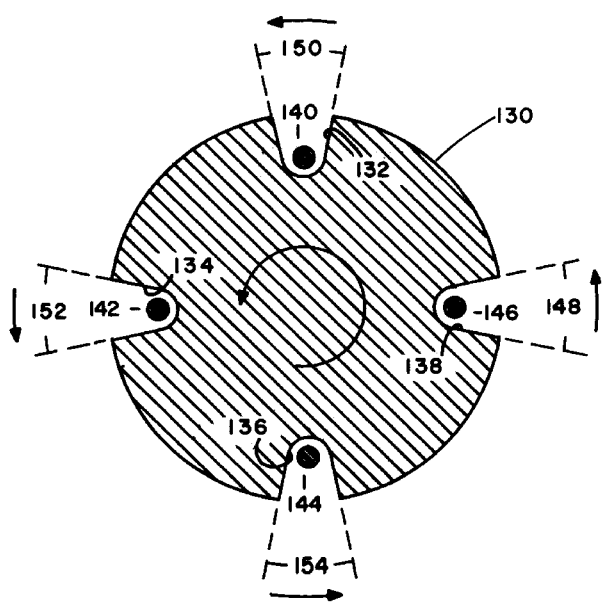

FIG. 8 includes a series of waveform diagrams illustrating the effect of reflected radiation on the output of the IR source of FIG. 7 at a point removed from the IR source;

FIG. 9 is a sectional view of reflective optics rotated about an IR source for spatial modulation purposes;

FIG. 10 is an exploded view of a four beam spatially modulated infrared source indicating the reflective elements therefor; and FIG. 11 is a sectional view of a four element four beam spatially modulated infrared source.

DETAILED DESCRIPTION

Figure 1:
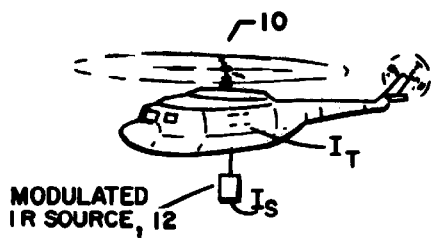
FIG. 1 is a diagramatic representation of a typical infrared counter-measure situation.

Referring now to FIG. 1, a target 10 such as a helicopter is provided with a modulated infrared source 12. This source is omnidirectional to provide a spherical zone of protection for the helicopter. Because of the internal combustion or jet engine of the target the target predominately radiates in the infrared region of the electromagnetic spectrum. The intensity of this infrared radiation is designated $I_T$ and in general involves a particular signature which varies with the configuration of the target as well as with the particular heat generating engine utilized. The intensity of the modulated infrared source is designated $I_S$. If the ratio $I_S$ to $I_T$ at any point in the far field in equal to or greater than 1 the modulated infrared source can be effective in countermeasuring incoming heat seeking missiles. Moreover, in some circumstances this ratio can be less than 1 and the modulated source will still be effective as a countermeasure. It is the function therefore of the modulated infrared source to produce modulated radiation of sufficient intensity to blanket or mask the essentially CW infrared radiation from the target to reduce the ability of the heat seeking missile to track the target and indicate to the heat seeking missile that the target is at a position in space removed from its actual position so that the heat seeking missile homes in on a point in space at a distance sufficiently removed from the target to prevent damage to the target. This has been accomplished in the past by modulating the infrared source so that the detected radiation has a predetermined pulse pattern sufficient to countermeasure the missile.

As mentioned hereinbefore, where energy availability is not a problem as with the burning of fuel for the infrared source, achieving the requisite $I_S/I_T$ ratio can be easily accomplished. However, for those targets in which energy is at a premium a more efficient modulating means than the temporal modulation of the prior art is necessary.

Figure 2:
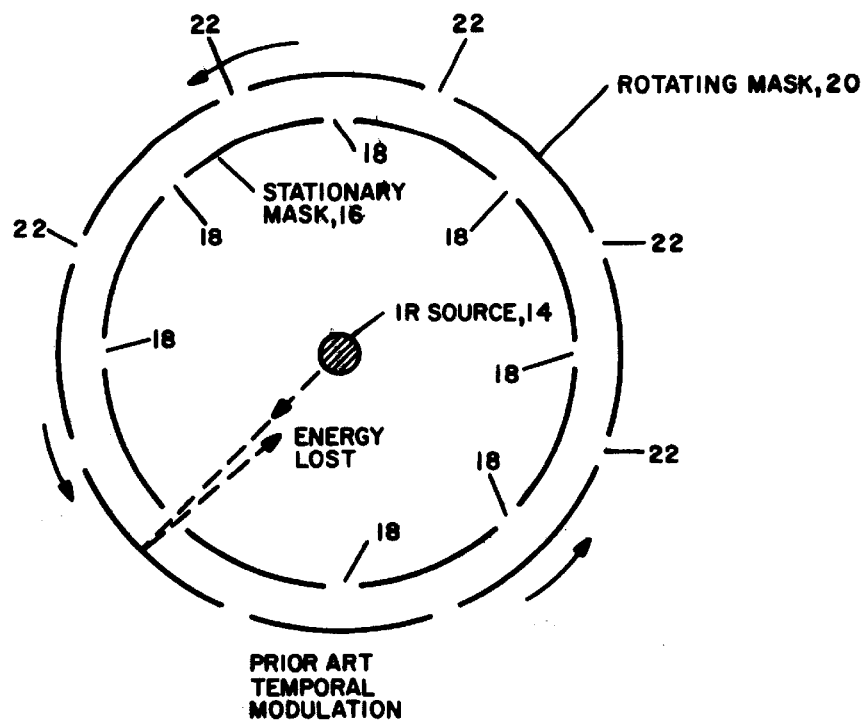
FIG. 2 is a diagramatic representation of temporal modulation of an infrared source.

Temporal modulation of an infrared source, commonly known as "chopping", may be accomplished by the apparatus illustrated in FIG. 2. In this case an infrared source 14 is located within a stationary mask 16 which has apertures 18 spaces around the periphery. The stationary mask is located co-axially with respect to a rotating mask 20 having apertures 22 which, when the mask 20 is rotated, come into alignment with apertures 18 in the stationary mask. When apertures 18 and 22 are in alignment radiation from the infrared source 14 is transmitted to the far field. When there is misalignment between apertures 18 and 22 energy from the infrared source is either absorbed by the rotating mask or reflected back to the infrared source. It will be appreciated that a large portion of this energy is lost in this process, making the temporal modulator of FIG. 2 unacceptable in situations where only a limited amount of energy is available. As mentioned before, when energy is not at a premium the temporal modulation technique illustrated in FIG. 2 is entirely satisfactory for countermeasure purposes However, because the energy is not focused from the IR source and more importantly because during a portion of the cycle the energy is absorbed by the rotating mask, the temporal modulation is not desired.

Figure 3:
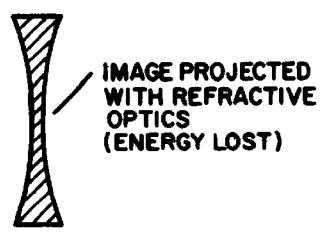
FIG. 3 is a diagramatic representation of an image projected with refractive optics.
Figure 4:
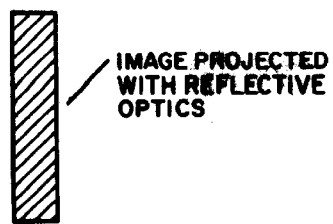
FIG. 4 is a diagramatic representation of an image projected with reflective optics of the type constructed in accordance with the subject invention

In addition to the provision of energy of the requisite intensity so that the above mentioned ratio is favorable, there is the problem of providing isotropically projected energy around an azimuth such that the energy is not distorted. When refractive optics are utilized to focus energy from an infrared source the image projected is not isotropic as illustrated in FIG. 3 but rather is broadened towards the edge of the image when a line source is projected. Thus when the modulated IR source is operating with very little tolerance in the margin necessary for the appropriate ratio it will be appreciated that intensity near the edge of the projected image may drop below the required ratio and thus the modulated source will be ineffective as a countermeasure. It is therefore desirable to project an image such as illustrated in FIG. 4 from a line source, in which the projected image is not too distorted. For the isotropically projected image the energy distribution across the projected image is uniform and maximized so that maximum use of the infrared source is possible. This type of image can be produced by the aforementioned temporal modulator of FIG. 2 since no focusing technique is utilized.

However, when energy is at a premium the temporal technique cannot be utilized and spatial modulation is required.

Figure 5:
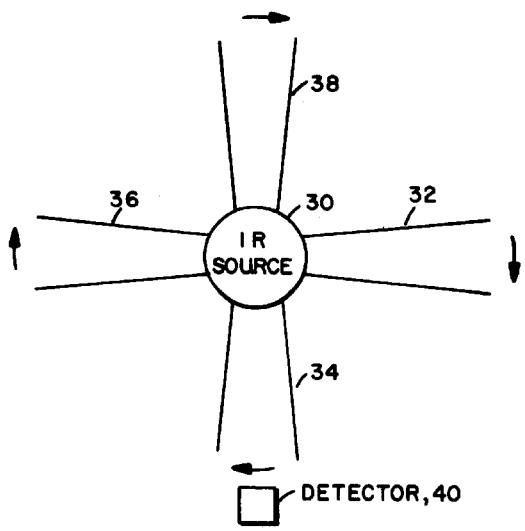
FIG. 5 is a diagramatic representation of a four beam spatial modulation technique.
Figure 6:
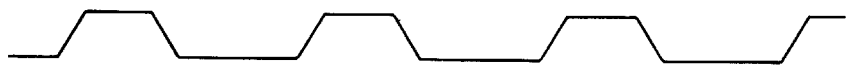
FIG. 6 is a waveform diagram of intensity vs. time for radiation from the source of FIG. 5 as detected at a point in space removed from the source.

Referring to FIG. 5, the concept of spatial modulation is illustrated. In general, spatial modulation refers to the transmission of one or more focused beams from an infrared source. In this diagram an infrared source 30 is illustrated as projecting four narrow collimated beams 32, 34, 36 and 38. As illustrated the beams are made to rotate or revolve about the source such that the beams are swept by a detector 40 sequentially. The desired waveform at the detector 40 is illustrated in FIG. 6 to be a relatively sharp pulsed waveform in which the rise and decay of the pulse occurs rapidly. As mentioned hereinbefore, because of the relatively long wavelength of the infrared radiation the obtaining of such a sharp waveform is difficult. Generation of such a waveform will be described in connection with FIGS. 9 et sequi. However, for the present purposes of discussion spatial modulation refers to the sweeping of a collimated infrared beam past a point in space.

As illustrated in FIG. 5, four beams are rotated or swept past detector 40. The reason for the four beam configuration is now described with reference to FIG. 7.

Referring to FIG. 7, infrared source 30 projects a narrow beam, beam 32. When the infrared source is located at a target it is possible that portions of the target close to the infrared source may act as reflectors for the source. These reflectors may inadvertently provide that the infrared radiation reaching detector 40 will resemble more a dc signal than a modulated signal. As illustrated in FIG. 7 a reflective object 42 may be in the path of beam 32 such that beam 32 is reflected as illustrated by a dotted line 44 towards detector 40 and will arrive at detector 40 after beam 34 has been detected.

Referring to FIG. 8, and more especically to waveforms designated the waveform from the reflecting object illustrated by the dotted pulse waveform may occur such that the detected signal returns to zero thereby preserving the modulation. As can be seen the combined waveform returns to a zero level at points 46. Thus while the detected signal will have a component from the reflecting object it will be appreciated that the detected signal is still modulated albeit at some other frequency.

Referring to waveforms designated B of FIG. 8, if a larger number than four beams are projected, radiation returned from the reflecting object may overlap significantly the direct radiation from the infrared source such that there will be no return to zero of the radiation detected by detector 40. The closest that the combined waveform comes to reaching the zero level is illustrated by points 48. Thus it is possible that a signal which is not sufficiently modulated will result. In general the maximum number of beams that can be projected without substantial reflective interference is a function of the duty cycle of the pulse train produced at a point in space removed from the source.

More specifically:

$$\text{the maximum number of beams} = 2 \times \frac{1}{\text{duty cycle}} \quad (1)$$

where, $$\text{the duty cycle} = \frac{\text{angular beam width measured at 0 level of beam}}{\text{angular spacing between the beams}} \quad (2)$$

For a 50% duty cycle, the largest number of beams that can be produced without the possibility of substantial overlap is 4, with the four beams spaced at 90°. When the beam width of the radiation is no more than 45° it is possible to limit the effects of reflected radiation so that the modulation is not destroyed.

It will be apparent that the narrower the beam the narrower the pulses produced and the more beams that can be projected without destructive interference due to reflection. Conversely the wider the projected beams the wider the pulses produced and the lower the number of beams that can be projected without interference. In general the wider the beam the wider the pulses produced and the greater the chance of overlap.

As a practical matter, anywhere from one to four beams may be utilized If one beam is utilized, it will be appreciated that the optics necessary to form this beam must be rotated at high speeds. The speed decreases with the number of beams with the optimum being a four beam configuration. The tradeoff is essentially the mechanical stability of the rotating optics and the ability to dynamically balance the rotor versus the narrowness of the beams and the duty cycle.

Apparatus which can efficiently provide spatial modulation while at the same time providing close to 100% energy utilization is illustrated in FIG. 9.

Referring now to FIG. 9 the modulator in general may include a body 106 having a longitudinal cavity with a parabolic cross section which has a cylindrical infrared source 104 at its focus. This source may be electric with an electrical potential being applied across the element (not shown in this figure). The parabolic walls of the cavity are reflective. In one embodiment source 104 is fixed and body 106 is rotated about this fixed source. When the body is elongated and has a longitudinal cavity of parabolic cross section, if the source is located along the focii of the cavity and if the body is rotated about an axis corresponding to these focii, a line of radiation is projected into space with a vertical beam angle of close to 180°. This line is swept by a point in space when the body is rotated to provide spatial modulation. In this manner a wide angle beam 108 of infrared radiation is swept. 360° with the rotation of the body 106 to achieve a sphere of protection about the aircraft on which it is mounted. It will be noted that blockage of the IR radiation from the source due to the target body is minimal in the far field. Because the modulation is omnidirectional it can be mounted virtually anywhere on the outside of the aircraft it utilized to protect. It should be noted that the beam formed by the FIG. 9 modulator incorporates radiation direct from the infrared source and radiation which is reflected only once. Thus close to 100% of the radiation from the source is present in the beam. This illustrates reflective optics rotated about a fixed infrared source to produce spatial modulation in which a portion of the radiation in the beam is not first reflected.

Another method of providing a four beam modulator is illustrated by the apparatus of FIG. 10 illustrated in exploded view.

Referring to FIG. 10, a number of elongated bodies 110 to 116 having cavities of parabolic cross section are stacked one on top of another in axial alignment such that the focii of respective parabolic cavities 118 through 124 are located along a center line 126. When an infrared line source 128 is located along this center line, the rotation of bodies 110 through 116 produce a four beam spatial modulation of the source, again with close to 100% of the radiation from the source being utilized. In this figure a power supply 129 is shown connected across cylindrical electrical element 128 for supplying power to heat the element. It will be appreciated that the IR source need not be continuous in this stacked embodiment, but can also be comprised of individual elements, one each per parabolic cavity.

Another type of four beam spatially modulated source is illustrated in FIG. 11.

In this figure a body 130 is provided with four elongated cavities having parabolic reflective surfaces 132 through 138. At the focus of each of these parabolas is located an infrared line source, herein designated as sources 140 through 146. In one embodiment as body 130 is rotated, the reflectors and sources being mounted on the body are rotated with the body such that rotating beams 148 through 154 are generated. It will be appreciated that a slip ring arrangement may be necessary for providing power to the rotating sources if electric elements are utilized. In the above embodiments the electrical elements may be made from silicon carbide and are available from the Norton Corp. under the trademark CRYSTAR.

What has been provided therefore is a number of spatial modulating techniques involving both single IR sources and multiple IR sources. In each of these sources a portion of the energy in the beam formed comes directly from the infrared generating means with the rest being reflected. When a single source is utilized it may be stationary with focusing optics revolving around the source. The revolving of the beams in each case provides spatial modulation of the radiation at a fixed point in space removed from the source. Alternatively the apparatus may be reciprocated or cyclically moved to produce spatial modulation. It will be apparent that direction of rotation or reciprocation is not critical in any of the embodiments illustrated.

Although a specific embodiment to the invention has been described in considerable detail for illustrative purposes, many modifications will occur to those skilled in the art. It is therefore desired that the protection afforded by Letters Patent be limited only by the true scope of the appended claims.

I claim:

1. Apparatus for countermeasuring a heat seeking missile approaching a heat radiating target in which the heat seeking missile has a guidance system comprising:

an infrared source at said target, and means for spatially modulating the radiation from said infrared source by generating a beam of infrared radiation and by periodically sweeping said beam past points in space to generate a number of pulses of infrared energy at each point in space for causing the guidance system in said heat seeking missile to guide said missile away from said target, said spatial modulating means including means for focusing said radiation into a beam such that a portion of the energy in said beam is derived directly from said infrared source and means for revolving said focusing means about said source.

2. The apparatus of claim 1 wherein said focusing means is reflective.

3. The apparatus of claim 2 wherein said focusing means includes stacked bodies having cavities of parabolic cross section, each of said bodies having its cavity oriented in a different direction, the focus of the parabola corresponding to said parabolically shaped cavities lying on a center line, said infrared source being positioned along said center line and wherein said revolving means includes means for revolving each of said bodies about the focus of the parabolic cavities.

4. The apparatus of claim 3 wherein said infrared source includes a line source.

5. The apparatus of claim 2 wherein said focusing means includes a body having a cavity opened outwardly and having reflective wall portions, said source being located within said cavity.

6. The apparatus of claim 5 wherein said cavity has a parabolic cross section.

7. The apparatus of claim 6 wherein said infrared source is at the focus of said parabola and wherein said body is revolved about said infrared source such that said infrared source is maintained at said focus.

8. A modulated infrared source comprising means for generating infrared radiation;

means for focusing said radiation into a beam such that a portion of the energy in said beam is derived directly from said generating means; and means for revolving said focusing means about said source thereby to sweep said beam repeatedly by a position in space removed from both said generating means and said focusing means; said focusing means including stacked bodies having cavities of parabolic cross section, each of said bodies having its cavity oriented in a different direction, the focus of the parabola corresponding to said parabolically shaped cavities lying on a center line, said infrared generating means being positioned along said center line and wherein said revolving means includes means for revolving each of said bodies about the focus of the parabolic cavities.

9. The infrared source of claim 8 wherein said infrared generating means includes a line source.

10. A method of countermeasuring a heat seeking missile approaching a heat radiating target in which the heat seeking missile has a guidance system comprising the steps of:

providing an infrared source at said target, and spatially modulating the radiation from said infrared source by generating a beam of infrared radiation and by periodically sweeping said beam past points in space to generate a number of pulses of infrared energy at each point in space for causing the guidance system in said heat seeking missile to guide said missile away from said target, said spatial modulating step including the use of means for focusing said radiation into a beam such that a portion of the energy in said beam is derived directly from said infrared source; and means for revolving said focusing means about said source.

11. The method of claim 10 wherein said focusing means is reflective.

12. The method of claim 11 wherein said focusing means includes stacked bodies having cavities of parabolic cross section, each of said bodies having its cavity oriented in a different direction, the focus of the parabola corresponding to said parabolically shaped cavities lying on a center line, said infrared source being positioned along said center line and wherein said revolving means includes means for revolving each of said bodies about the focus of the parabolic cavities.

13. The method of claim 12 wherein said infrared source includes a line source.

14. The method of claim 11 wherein said focusing means includes a body having a cavity opened outwardly and having reflective wall portion said source being located within said cavity.

15. The method of claim 12 wherein said cavity has a parabolic cross section.

16. The method of claim 6 wherein said infrared source is at the focus of said parabola and wherein said body is revolved about said infrared source such that said infrared source is maintained at said focus.

* * * * *